(12) United States Patent  (10) Patent No.: US 8,240,530 B2
Fletcher et al.  (45) Date of Patent: Aug. 14, 2012

(54) ELECTRONIC ACCESSORY CARRIER

(75) Inventors: Donna M. Fletcher, Auburn, NY (US);
Timothy R. Fitch, Syracuse, NY (US);
Vincent S. Garmon, Waxhaw, NC (US);
Paul B. B. Weslake, Waxhaw, NC (US)

(73) Assignee: Hand Held Products, Inc., Skaneateles Falls, NY (US)

(*) Notice: Subject to any disclaimer, the term of this patent is extended or adjusted under 35 U.S.C. 154(b) by 1166 days.

(21) Appl. No.: 11/540,898

(22) Filed: Sep. 29, 2006

(65) Prior Publication Data
US 2008/0078794 A1 Apr. 3, 2008

(51) Int. Cl.
*A45F 3/14* (2006.01)
*A45F 3/02* (2006.01)

(52) U.S. Cl. .......................... 224/616; 224/257; 224/930

(58) Field of Classification Search ................... 224/616, 224/257, 930, 576, 192, 193, 607, 614, 617, 224/666, 676, 677; 235/462.44
See application file for complete search history.

(56) References Cited

U.S. PATENT DOCUMENTS

| | | | |
|---|---|---|---|
| 2,533,850 A | 12/1950 | Syracuse | |
| 2,710,639 A | 6/1955 | Farls | |
| 2,717,015 A | 9/1955 | Berry | |
| 3,259,285 A | 7/1966 | Bush | |
| 3,537,628 A | 11/1970 | Thompson | |
| 3,762,616 A * | 10/1973 | Brunstetter | 224/625 |
| 4,593,186 A * | 6/1986 | Swartz et al. | 235/462.36 |
| 4,810,102 A | 3/1989 | Norton | |
| 4,917,281 A * | 4/1990 | Ostermiller | 224/661 |
| 4,989,656 A | 2/1991 | Derfler | |
| 5,022,528 A | 6/1991 | Savoy | |
| 5,169,043 A | 12/1992 | Catania | |
| D341,939 S | 12/1993 | Zelcer | |
| 5,395,023 A * | 3/1995 | Naymark et al. | 224/682 |
| D371,457 S | 7/1996 | Jacobs | |
| 5,657,201 A * | 8/1997 | Kochis | 361/679.41 |
| 5,868,227 A | 2/1999 | Garcia | |
| 6,016,944 A | 1/2000 | Girbert | |
| 6,047,752 A | 4/2000 | Southwick | |
| 6,102,266 A * | 8/2000 | Chacon et al. | 224/679 |
| 6,298,993 B1 * | 10/2001 | Kalozdi | 206/581 |
| 6,588,639 B2 | 7/2003 | Beletsky et al. | |
| 6,698,636 B2 | 3/2004 | Angus et al. | |
| 6,769,586 B1 | 8/2004 | Beletsky et al. | |
| 6,863,202 B2 | 3/2005 | Ammerman | |
| 6,892,914 B2 | 5/2005 | Girbert | |
| 2003/0197042 A1 | 10/2003 | Warren | |
| 2003/0213827 A1 | 11/2003 | Langmuir | |
| 2005/0056674 A1 | 3/2005 | Renn | |
| 2005/0199663 A1 * | 9/2005 | Heaton et al. | 224/269 |
| 2005/0205633 A1 | 9/2005 | Godshaw et al. | |

* cited by examiner

*Primary Examiner* — Nathan J Newhouse
*Assistant Examiner* — Corey Skurdal
(74) *Attorney, Agent, or Firm* — Hiscock & Barclay, LLP

(57) ABSTRACT

An electronic accessory carrier for a portable data terminal provides a shell sized to hold and maintain a portable data terminal in a predetermined position with respect to the shell, at least one attachment component affixed to the shell at a predetermined location and adapted to provide support to the shell and a held portable data terminal in a predetermined orientation, and a strap having an attachment mechanism for connection to the at least one attachment component and adapted to encircle a wearer and to support the shell and a portable data terminal in the predetermined orientation and at a location on the wearer adapted to enable use of the portable data terminal in the predetermined orientation.

8 Claims, 8 Drawing Sheets

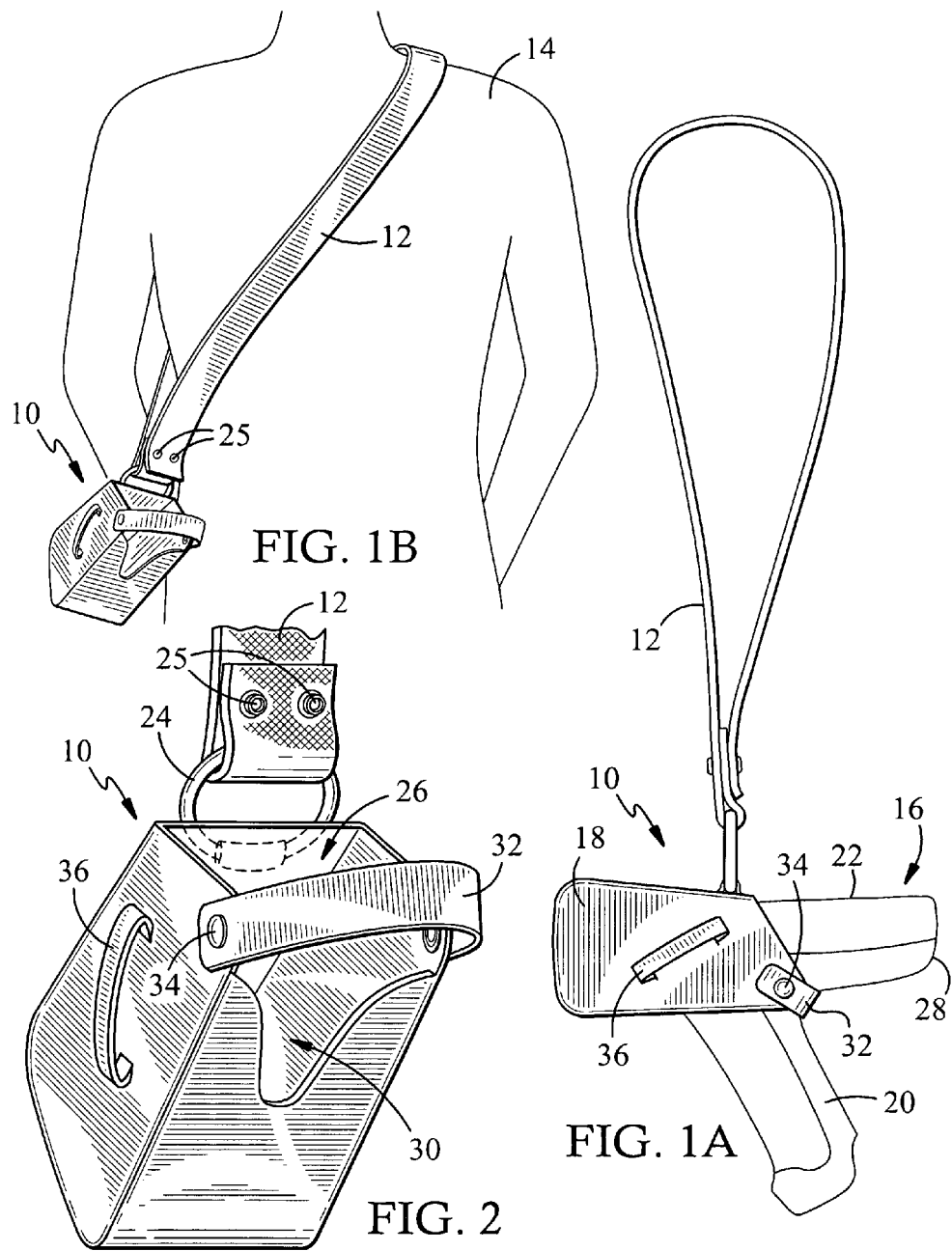

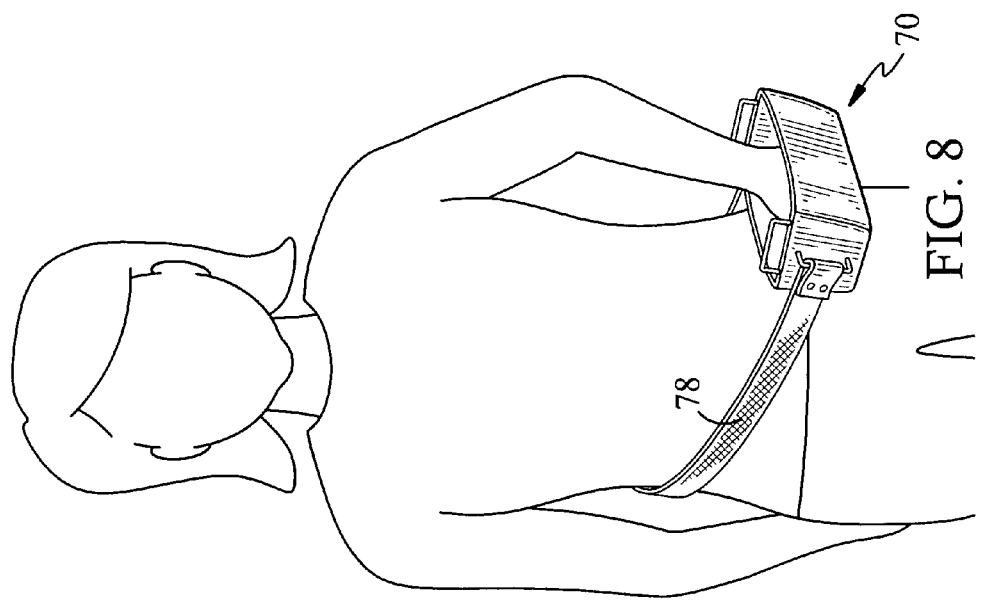
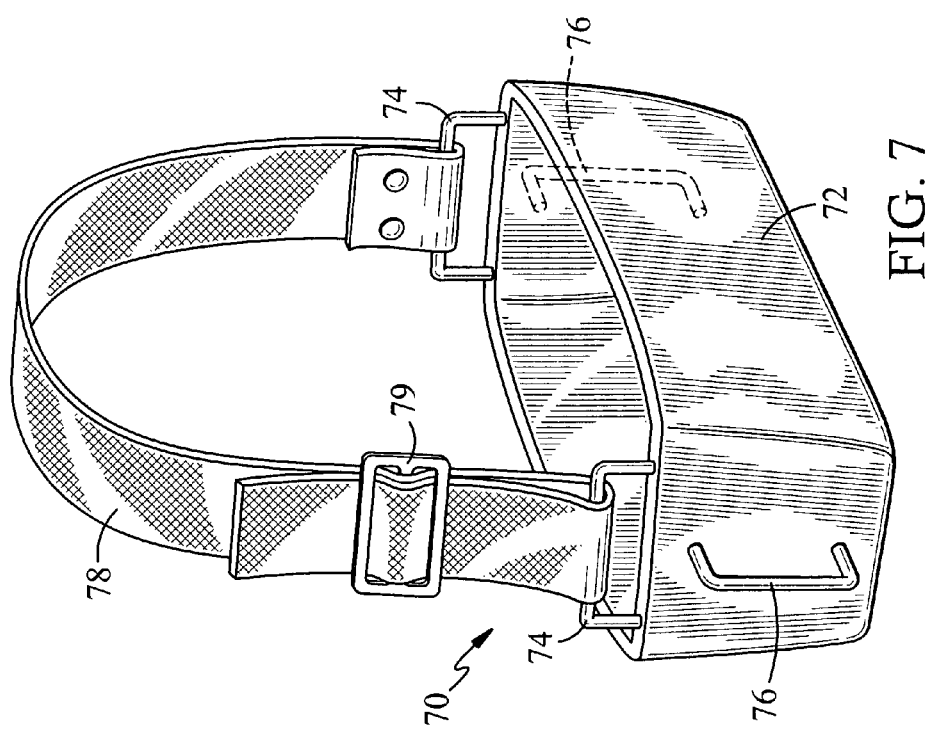

ELECTRONIC ACCESSORY CARRIER

BACKGROUND OF THE INVENTION

Portable data terminals (PDTs) are a type of data collection device used to collect, interpret, process, and ultimately transfer data to a larger data processing system. PDTs generally integrate a mobile computer, an alpha-numeric or numeric keypad, and at least one data acquisition device. The mobile computer portion is generally similar to known touch screen consumer oriented portable computing devices (e.g. "Pocket PCs" or "PDAs"). PDTs are available from several sources, including the assignee of the present application: HAND HELD PRODUCTS, INC.

Currently PDTs are generally worn tool belt style, hooked to the user's pants belt or to a purchased utility belt geared mainly for wear by males. Thus, it would be advantageous if the above-identified type of carrier products had better transportability and wear-ability to improve functionality and especially for female workers in the retail environment.

SUMMARY OF THE INVENTION

Various embodiments described herein provide an electronic accessory carrier for electronic devices, such as portable data terminals. For example, one embodiment comprises: a shell sized to hold and maintain a portable data terminal in a predetermined position with respect to the shell; at least one attachment component affixed to the shell at a predetermined location and adapted to provide support to the shell and a held portable data terminal in a predetermined orientation; and a strap having an attachment mechanism for connection to the at least one attachment component and adapted to encircle a wearer and to support the shell and a portable data terminal in the predetermined orientation and at a location on the wearer adapted to enable use of the portable data terminal in the predetermined orientation.

The carrier may further comprise a second attachment component affixed to the shell at a second predetermined location and adapted to provide support to the shell and a portable data terminal in the predetermined orientation, in cooperation with the at least one attachment component, wherein the strap includes a second attachment mechanism for connection to the second attachment component. Both the at least one attachment component and the second attachment component may be adapted to provide connection of the strap to the shell from both a lateral and a superior direction relative to the predetermined orientation.

The carrier may further comprise a third attachment component located on a side of the shell to enable retention of the shell by a separate waist belt. The carrier may still further comprise a separate waist belt adapted to engage the third attachment component. The shell may include an opening located within the shell to allow the extension of a hand grip of the PDT from the shell. The carrier may yet further comprise a fourth attachment component affixed to the shell and adapted to enable the removable attachment of articles to the shell. The strap may contain accessory components for the storage of items used either in the retail trade or in healthcare.

The shell may have a top portion that is at least partially open to allow access to a portable data terminal located within the shell. The top portion of the shell may be completely open, and further comprise a retention member adapted to retain a portable data terminal within the shell. The retention member may be a strap adapted to be affixed over the top portion of the shell. The retention member may be adapted to connect between the shell and the portable data terminal located within the shell. The top portion may be partially covered by a transparent window.

The shell may include at least one open or transparent portion therein for allowing photonic transmission to and from a predetermined portion of a portable data terminal. The at least one open or transparent portion of the shell may be adapted to allow a photonic scanning function to be performed by the portable data terminal.

The shell may be constructed with radio frequency (RF) blocking material and may further include RF windows located to allow RF energy to pass through predetermined portions of the shell.

The shell may be reinforced with plastic or cardboard. The shell may be covered with a rugged, abrasive resistant material. The shell may be water-resistant and contain weep holes. The at least one attachment point and the strap may be adapted to allow the strap to be alternatively worn as a shoulder strap or as a waist belt. The shell may be padded with a foam-like material. The strap may contain an adjuster for adjusting the length of the strap. The terminal portion of the strap may be a snap coupling.

BRIEF DESCRIPTION OF THE DRAWINGS

Embodiments of the present invention are illustrated and described in reference to the appended drawings in which:

FIG. 1A is a side view of a PDT carrier, constructed in accordance with one embodiment of the present invention, and shown in combination with a PDT in phantom;

FIG. 1B is a pictorial illustration of the carrier of FIG. 1A, as it would be worn;

FIG. 2 is a close-up pictorial illustration of the carrier depicted in FIGS. 1A and 1B;

FIG. 7 is an a pictorial illustration of a carrier constructed in accordance with yet another embodiment of the present invention;

FIG. 8 is a pictorial illustration of the carrier of FIG. 7 being worn as a waist belt;

DETAILED DESCRIPTION OF THE DRAWINGS

Figure 3A:
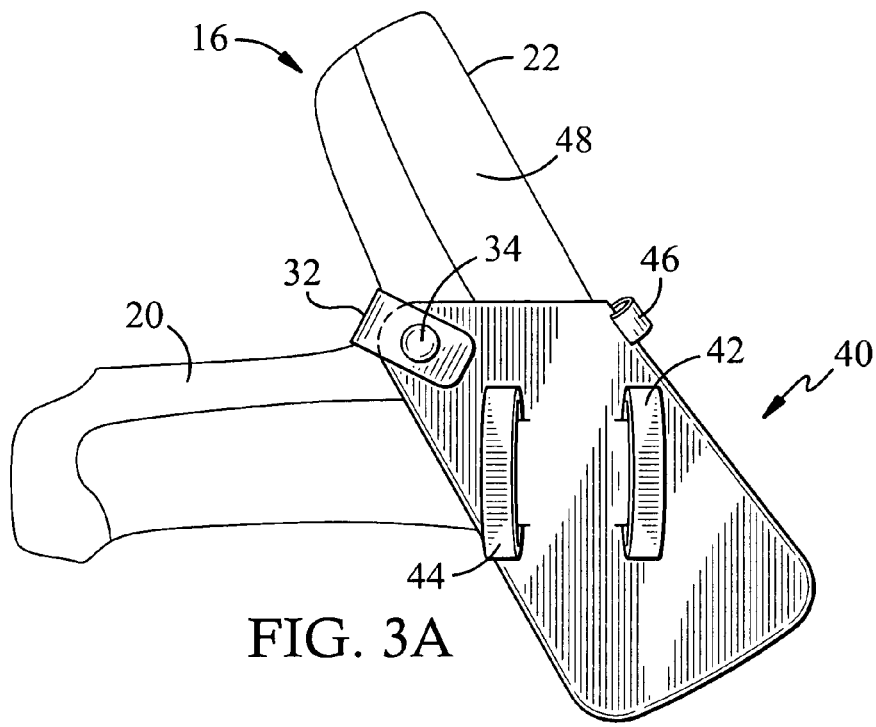
FIGS. 3A and 3B are opposing side views of a carrier constructed in accordance with one embodiment of the present invention.

The figures illustrate various embodiments of a unisex electronic device carrier that is not only versatile for all users, but is also comfortable and protects the device during transit. The illustrated embodiments are directed toward a PDT, however other types of electronic devices may benefit from the present invention. The illustrated carrier is designed in a number of various configurations such as a pouch, holster, etc. as is described below. The illustrated carrier can be worn as a fanny pack, as a belt style holster, across left shoulder to right hip (messenger bag style), across right shoulder and left hip, over left or right shoulder or slung to the back from either shoulder. The illustrated carrier includes specific padding to prevent damage to the portable data terminal and is rigidly constructed to prevent collapse of the form. The padding lines the inner surface of the carrier to protect the PDT during transit. The exterior material may be abrasion resistant and water resistant. Examples of such materials include, but are not limited to, ballistic or CODURA nylon, and polyester with vinyl backing as well as materials coated with durable water repellents (i.e. waterproofing film). Embodiments of the carrier are described in a variety of embodiments set forth below.

FIG. 1A is a side view of an electronic accessory carrier 10 holding a portable data terminal (PDT) 16, shown in phantom, and generally including a shell 18 and a strap 12. FIG. 1B shows the same carrier 10 and strap 12, as it would be worn by a person 14. FIG. 2 shows a close-up view of the carrier 10 with only a portion of the strap 12. Carrier 10 includes a shell 18 that is sized to hold, support and maintain PDT 16 in a predetermined orientation wherein a handle 20 of PDT 16 extends generally downwardly and a top surface 22 of PDT 16 faces generally upwardly, as shown in FIG. 1A. Carrier 10 also includes an attachment component 24 affixed to shell 18 and adapted to provide support to shell 18 and PDT 16, also in the orientation shown in FIG. 1A.

Strap 12 includes a suitable attachment mechanism in the form of rivets or snaps 25 to aid in donning and doffing the carrier 10 by the wearer. Carrier 10 is shown in FIG. 1B to be conveniently located next to the wearers hip where the PDT would be readily available for use by the wearer, while being worn.

FIG. 2 shows further detail of carrier 10 in the form of a rear opening 26 which allows the rear portion 28 of PDT 16 (FIG. 1A) to extend outside of carrier 10. Opening 26 extends around to the bottom area 30 of carrier 10 to allow handle 20 to protrude there from. Opening 26 is spanned by a retention strap 32, which is adapted to extend around the back of handle 20, when a PDT 16 is located within shell 18. Strap 32 may be secured by any suitable means, such as a snap 34. FIG. 2 also shows an accessory attachment component 36 located on the side 38 of shell 18 and adapted to enable further attachment to shell 18.

Figure 3B:
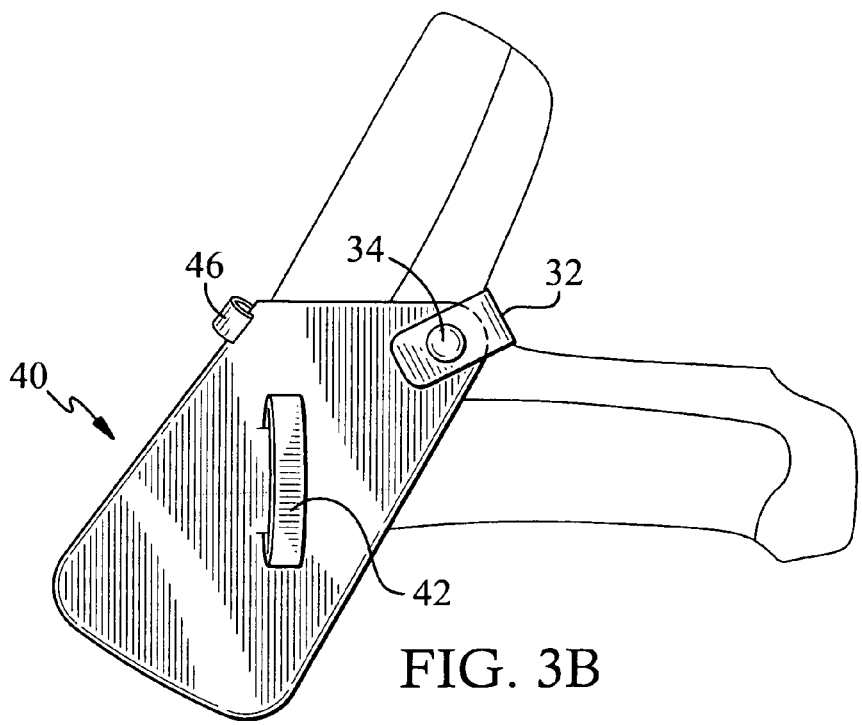

FIGS. 3A and 3B show alternate side views of a carrier 40 shaped similarly to carrier 10, but further including a pair of attachment components in the form of belt loops 42, 44, which enable carrier 40 to function in the manner of a holster. The angular position of carrier 40 shown in FIGS. 3A and 3B allows the top 22 of PDT 16 to be viewed and accessed while being worn. Although belt loops 42, 44 are shown, any suitable belt attachment may be used in their place on carrier 40, such as a removable belt clip. Carrier 40 also includes a further attachment component 46, to which a lanyard or strap similar to strap 12 (FIG. 1A) may be attached. In this manner, carrier 40 may be worn by either a waist belt or a shoulder strap, such as 12 (FIG. 1B), or by both at the same time. Thus, the weight of a PDT 16 could be born by a shoulder strap, such as 12, while the position of PDT 16 may be maintained by a waist belt. With a removable belt clip instead of belt loops 42, 44, carrier 40 and a PDT 16 might be carried by a waste belt most of the time and accessed in that position, while allowing easy removal and more flexible use of PDT 16, with the safety and convenience of a lanyard or shoulder strap as desired. Although the arrangement of FIG. 3A indicates that the handle 20 of PDT 16 may be horizontal so that top 22 angles somewhat upwardly, belt loops 42, 44, might also be so arranged, so that the main body 48 of PDT 16 is maintained in a horizontal position for better access to top 22, or even in a vertical position. Snaps 34 and belt loops 42 may also be located on both sides of carrier 40 to provide both left and right-handed usage.

Figure 4:
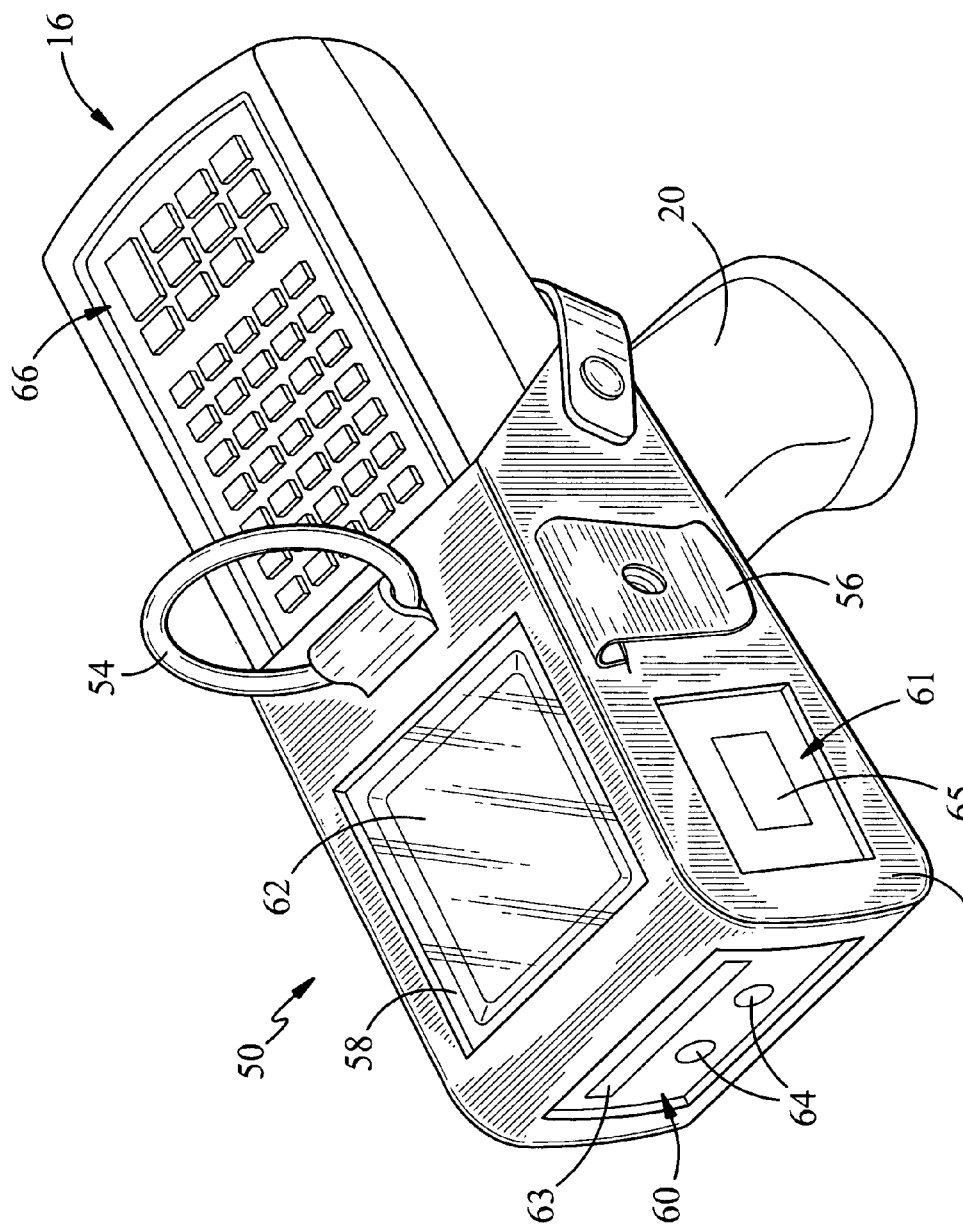
FIG. 4 is a pictorial illustration of a PDT enclosed within a another carrier constructed in accordance with another embodiment of the present invention.

FIG. 4 shows another embodiment of the present invention in a carrier 50, which is shaped similarly to the previously described carriers 10, 40. Carrier 50 includes a shell 52 having a first attachment component 54, similar to component 24 (FIG. 2), and a second attachment component 56 in the form of a removable belt clip. Shell 52 is shown to include a transparent window 58 and a couple of openings 60, 61. Window 58 is located to allow viewing of an LCD display 62 located in PDT 16 and is constructed of a transparent plastic that is flexible enough to enable usage of display 62 as a touch screen. Opening 60 is located to allow light or photonic transmission to and from a predetermined part of PDT 16 in the form of a scanning sensor 633 and a pair of illumination sources 64. In this manner, PDT 16 maybe used for scanning or capturing scanned information while still located within shell 52 and carrier 50. It should be kept in mind that a transparent optical window may be used in place of opening 60 if it is suitable and that such window need only be transparent to the wavelength of photonic energy being used, such as infrared as opposed to visible light.

Opening 61 allows direct physical access to a predetermined portion of PDT 16 that might be normally enclosed by shell 52 to enable any desired function that requires physical access. The present form of PDT 16 includes a finger print sensor 65 for purposes of demonstration. Other forms of physical access that might be necessary include manual switches or a direct electrical connection, such as power or data wires or a flash memory device.

Shell 52 further shows the exposure of the rear top portion of PDT 16, which would allow direct access to any manner of switches, push buttons or even a keypad 66. In the manner described for this feature as well as window 58 and openings 60, 61, shell 52 may be provided with any other necessary data access points to suit the particular PDT to be carried.

Figure 5:
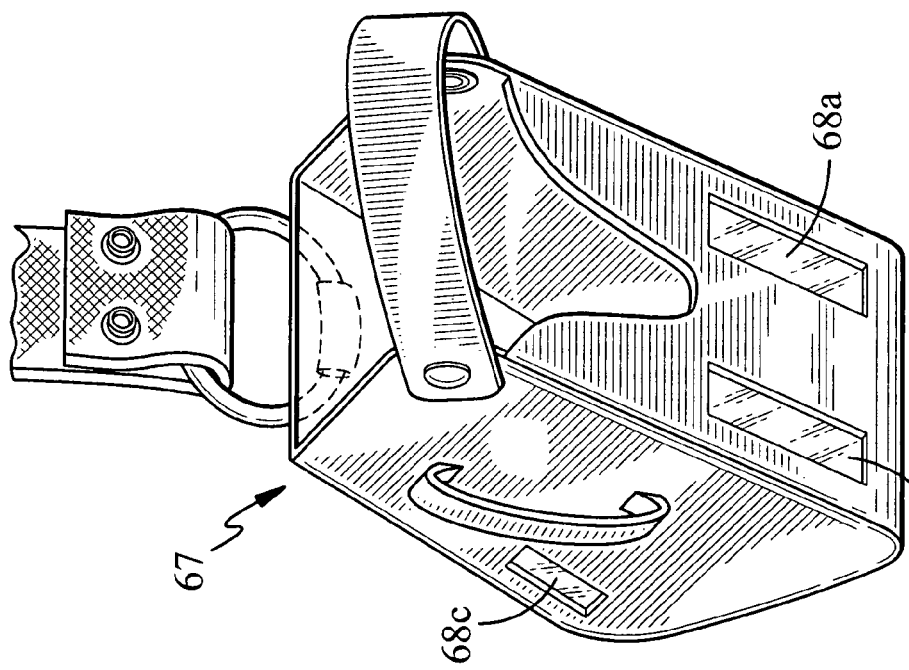
FIG. 5 is a pictorial illustration of another carrier having a variety of transparent optical windows.

FIG. 5 shows another carrier 67 in which are located another series of transparent windows 68a, 68b, 68c to demonstrate that such windows may be placed anywhere and serve different access functions. Such windows 68a, 68b, 68c may also be tailored for RF energy for such purposes as RFID scanning or main frame computer communication, while the remainder of carrier 67 may be constructed to resist penetration by RF energy and thereby reduce any interference with the functioning off a PDT.

Figure 6:
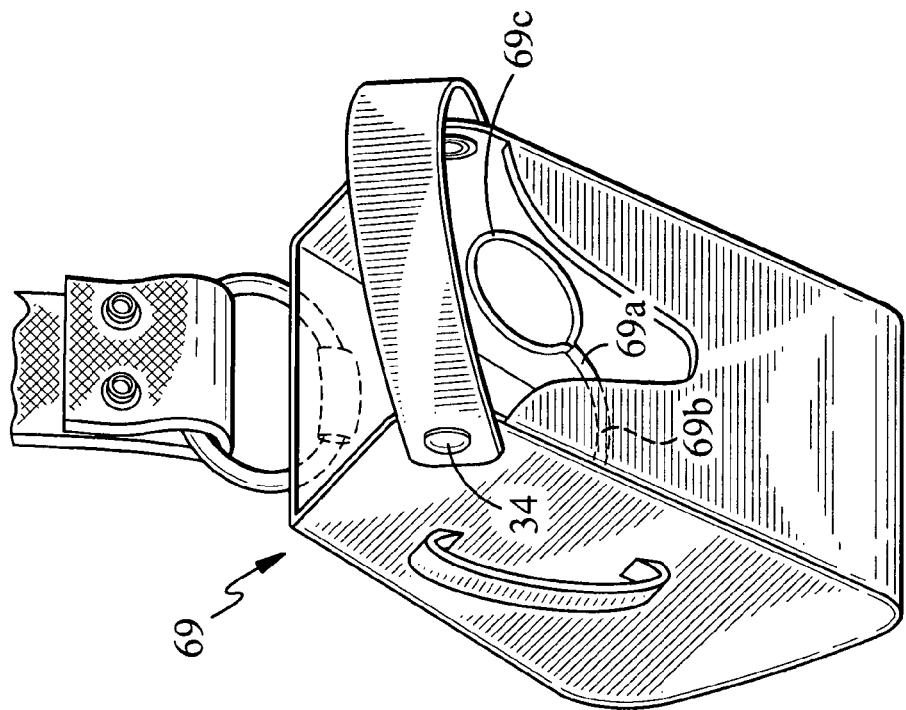
FIG. 6 shows an exemplary lanyard connection attachment to the carrier.

FIG. 6 illustrates an additional protective feature for the PDT, which is provided in a carrier 69 in the form of a cable connection 69a having a proximal end 69b attached to a seam in carrier 69 and a distal loop 69c adapted for removable attachment to a PDT. The lanyard connection 69a acts as a safety device for the PDT carrier in the event of an unintentional release of snap 34.

Figure 9:
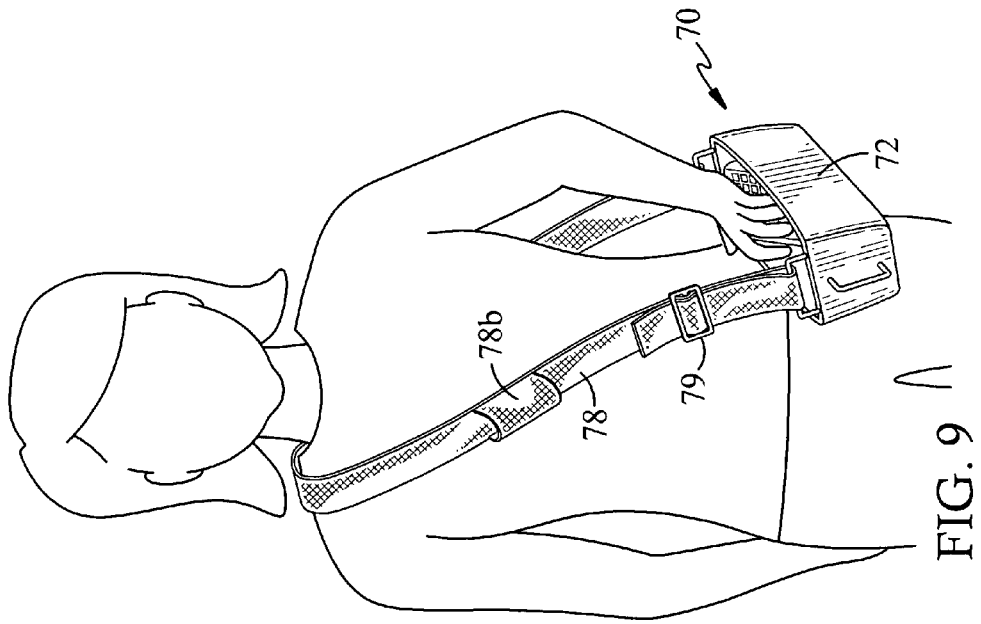
FIG. 9 is a pictorial illustration of the carrier of FIG. 7 being worn as a shoulder strap.

FIGS. 7-10 show another carrier 70 having a shell 72 and two pairs of attachment components 74, 76 for alternate use in supporting shell 72. Attachment components 74, 76 are formed as rigid loops or rings. FIG. 7 shows a strap 78 attached to components 74 to support carrier 70 from above as a shoulder carrier as depicted in FIG. 9. Although attachment components 74 have a rectangular shape, any suitable shape may be used. Another example would be a trapezoidal shape with a horizontal top bar only as wide as strap 78 to thereby restrict lateral movement of attached strap 78 with respect to shell 72. Carrier 70 is shown being worn in its alternative arrangement in FIG. 8 with strap 78 attached to components 76 and worn as a waist belt. Attachment components 76 provide better support to carrier 70 when it is worn in this manner. An adjuster 79 (FIGS. 7, 9) is provided for strap 78 to provide the best fit for each user and for each of the strap arrangements described. FIG. 9 shows that strap 78 may further include any form of convenient carrier or pocket 78b for small articles, such as those used either in the retail trade or in healthcare.

Figure 10A:
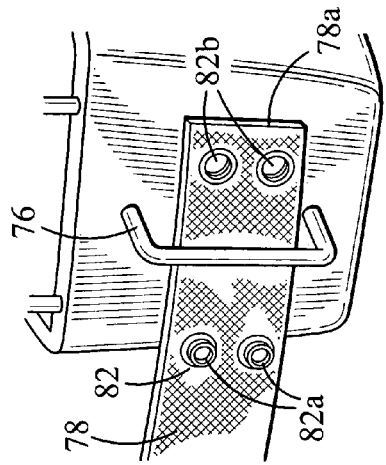
FIG. 10 pictorially depicts the attachment between the shell and strap of the carrier of FIG. 8.
Figure 10B:
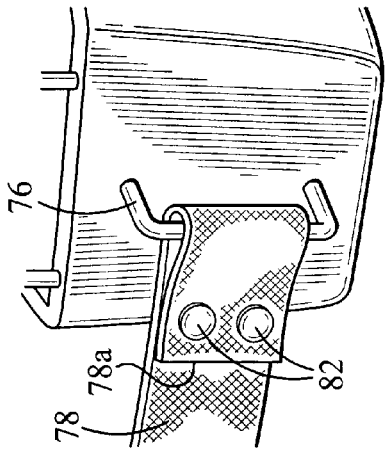

FIGS. 10A and 10B are alternate views of one end 78a of belt 78. In FIG. 10A, belt end 78a extends through an attachment component 76 and exposes the engagement elements of male and female snaps 82a, 82b, respectively. In FIG. 10B, belt end 78a is folded over to engage snaps 82. Also, any suitable, durable, attachment mechanism may be used in place of snaps 82.

Figure 11:
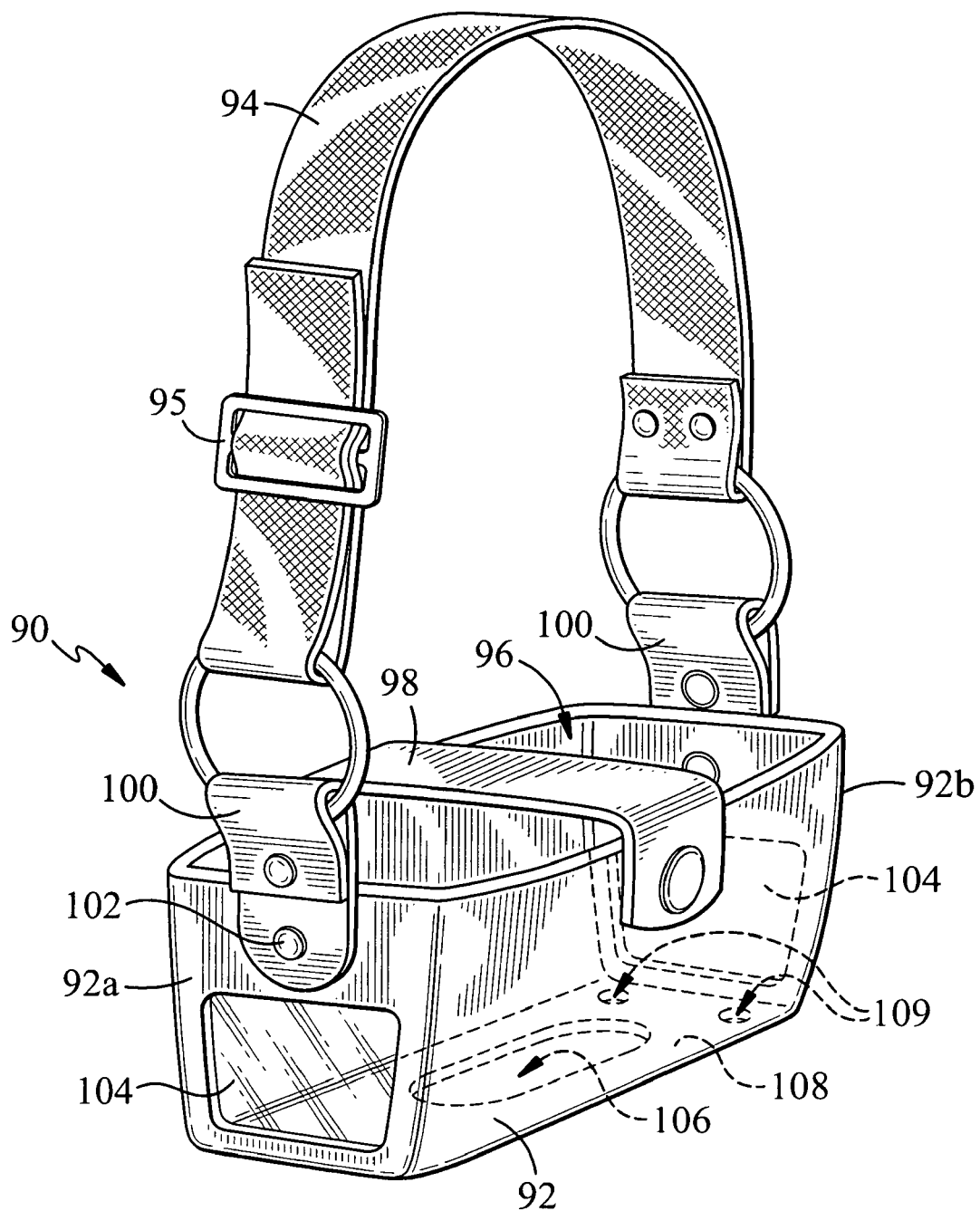
FIG. 11 pictorially illustrates a carrier constructed in accordance with still another embodiment of the present invention.

FIG. 11 shows another carrier 90, which generally includes a rigid or semi-rigid shell 92 and a strap 94. Shell 92 has a substantially open top 96 to allow access to a PDT (not shown) located therein, and further includes a strap 98 adapted to bridge the open top 96 to thereby retain a PDT within the confines of shell 92. Alternatively, a cable arrangement similar to that shown in FIG. 6 may be used to retain a PDT within shell 92. Shell 92 includes a pair of attachment components 100, which are attached to shell 92 by a respective single rivet 102. This arrangement allows attachment components 100 to rotate relative to shell 92 to allow support of shell 92 in the upright position shown from either a superior direction (from above), when strap 94 is used as a shoulder strap, or from a lateral position when strap 94 is used as a waist belt.

Shell 92 is also shown to include an optical window 104 located in each end 92a, 92b. Optical windows 104 allow a PDT (not shown) located within shell 92 to perform a scanning function while remaining within shell 92. The pair of windows 104 allows a PDT to be oriented in either direction within shell 92. Shell 92 is still further shown to include an opening 106 (in phantom) located in the base 108 to allow the handle similar to handle 20 (FIGS. 1B, 3A, 3B) to extend there through. Opening 106 is shaped to allow a PDT to be oriented in either direction within shell 92. Base 108 may further include weep holes 109 to prevent the accumulation of any liquid within shell 92. Strap 94 is shown disproportionately short in FIG. 11 for the convenience of illustration, and includes a length adjuster 95 for user convenience.

Figures 12A, 12B:
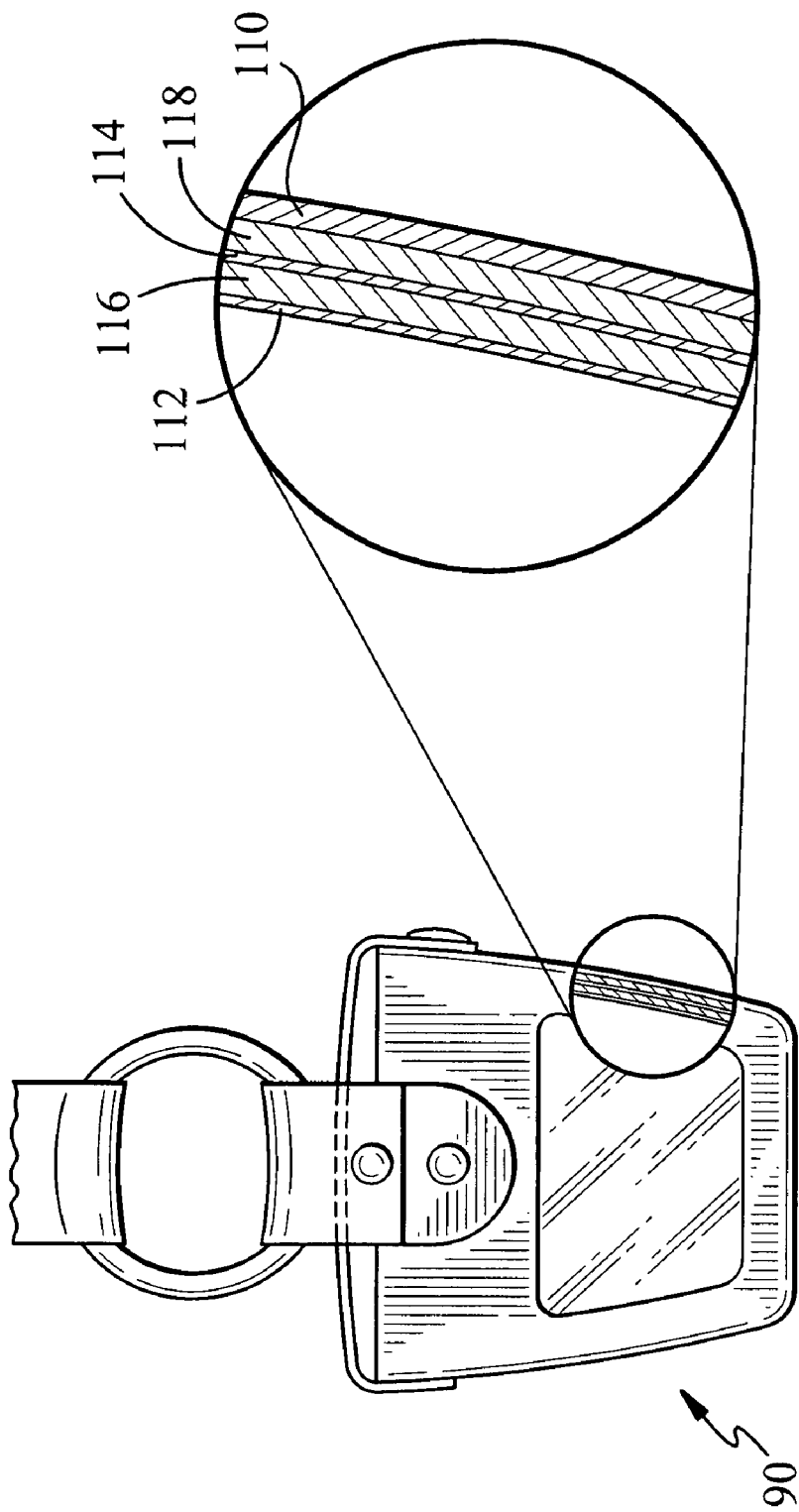
FIG. 12A is an end view of the carrier of FIG. 11.
FIG. 12B illustrates a cross section of the carrier shown in FIG. 12A.

Various carriers of the present application may contain interior padding for the protection of the PDT during use and transit. FIG. 12A illustrates an end view of carrier 90. A cross-section of the exterior and interior construction of carrier 90 is viewable in FIG. 12B. The rugged abrasion-resistant material 110 and inner lining 112 provide protection and covering for the frame 114 of the carrier 90. Adjacent to each of these features is an inner pocket 116 and outer pocket 118 of foam or other cushioning material to support and pad the frame 114 of the pouch. The frame 114 is constructed of reinforcing light-weight, relatively rugged material such as cardboard or plastic. All of the layers 110, 112, 114, 116, 118 may be made breathable to prevent the accumulation of moisture and outer layers 110, 112 may be made water repellant to minimize the absorption of moisture. Layers 112 and 116 may also be constructed to carry antimicrobial agents.

It should be noted that in all embodiments, the exterior covering of the various carriers may be equipped with outside pockets for the storage of batteries and other supporting materials such as small note pads and pens. Devices such as power boosters, antennas, anti theft transponders, GPS can be stitched into the inner lining or the rugged abrasion-resistant material. These devices further enhance the task management of workers in the retail environment as well as provide mechanisms for the retailer to monitor its employees. A printer may also be built into the internal cavity of the carriers to connect with the stored PDT. A battery cell, including ports for a power jack, may be installed to charge the PDT battery while it is stored or operated in the carriers. Heating or insulating elements may also be installed into the external rugged material or the inner lining for long term use in cold storage.

With the addition of printers or other devices mentioned herein, weep holes may be inserted into the inner lining or the rugged material to allow the fabric to breathe while said devices are in operation. Weep holes may also be installed at the base of the carrier 10 to provide an egress for accidental liquid spills into the carrier.

Although the invention has been described with respect to various embodiments, it should be realized this invention is also capable of a wide variety of further and other embodiments within the spirit and scope of the appended claims.

What is claimed is:

1. A portable data terminal system comprising:
   (a) a portable data terminal having a handle which extends generally downwardly and a top surface which faces generally upwardly, the portable data terminal having a scanning sensor for scanning scanned information;
   (b) a shell sized to hold and maintain the portable data terminal in a predetermined position with respect to the shell, the shell having a front portion and a rear opening which allows a rear portion of the portable data terminal to extend outside of the carrier and wherein the rear opening extends around to a bottom area of the carrier to allow the handle of the portable data terminal to protrude there from;
   (c) a transparent window for scanning therethrough
   (d) at least one attachment component affixed to the shell at a predetermined location and adapted to provide support to the shell and the held portable data terminal in a predetermined orientation; and
   (e) a strap having an attachment mechanism for connection to the at least one attachment component and adapted to encircle a wearer and to support the shell and a portable data terminal in the predetermined orientation and at a location on the wearer adapted to enable use of the portable data terminal in the predetermined orientation to allow the portable data terminal to perform a scanning function while remaining within the shell.

2. The carrier of claim 1, further comprising a second attachment component located on a side of the shell to enable retention of the shell by a separate waist belt.

3. The carrier of claim 2, wherein the second attachment component is a removable belt clip.

4. The carrier of claim 3, further comprising a third attachment component affixed to the shell and adapted to enable the removable attachment to the portable data terminal to act as a safety device for the portable data terminal in the event of an unintentional release of the strap.

5. The carrier of claim 1, wherein the shell includes at least one open or transparent window in the front portion therein for allowing photonic transmission to and from a predetermined portion of the portable data terminal to allow the portable data terminal to perform a scanning function while remaining within the shell.

6. The carrier of claim 5, wherein the at least one open or transparent window of the shell is adapted to allow a photonic scanning function to be performed by the portable data terminal.

7. The carrier of claim 1, further comprising a retention strap spanning the rear opening adapted to extend around the back of the handle when the portable data terminal is located within shell.

8. The carrier of claim 7, further comprising a cable connection having a proximal end attached to a seam in the shell and a distal loop adapted for removable attachment to the portable data terminal to act as a safety device for the portable data terminal in the event of an unintentional release of the strap.

* * * * *